O. A. & L. J. BEVAN.
VARIABLE GEARING FOR THE TRANSMISSION OF POWER.
APPLICATION FILED APR. 26, 1915.
1,178,837.
Patented Apr. 11, 1916.
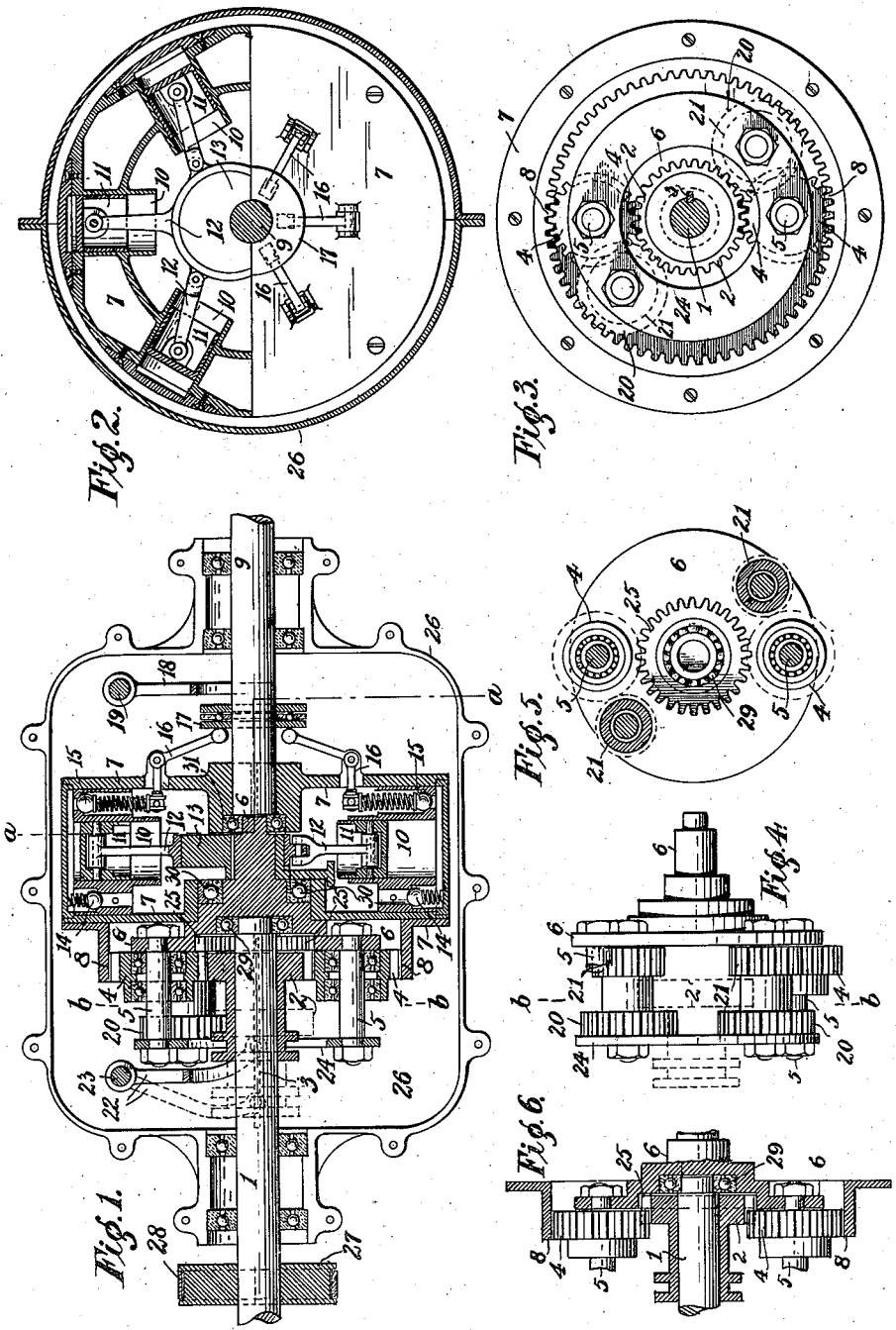

UNITED STATES PATENT OFFICE.

OSWALD ALFRED BEVAN AND LESLIE JAMES BEVAN, OF MALVERN, VICTORIA, AUSTRALIA.

VARIABLE GEARING FOR THE TRANSMISSION OF POWER.

1,178,837.  Specification of Letters Patent.  Patented Apr. 11, 1916.

Application filed April 26, 1915. Serial No. 24,072.

*To all whom it may concern:*

Be it known that we, OSWALD ALFRED BEVAN and LESLIE JAMES BEVAN, subjects of the King of Great Britain, residing at 177–181 High street, Malvern, in the State of Victoria, Commonwealth of Australia, have invented new and useful Improvements in Variable Gearing for the Transmission of Power, of which the following is a specification.

This invention relates to certain improvements in variable gearing for the transmission of power and refers to gearing for obtaining variations in speed in the transmission of power from a rotating driving shaft to a driven shaft being more particularly applicable to variable gearing for motor cars, self-propelled vehicles, power launches, winches, hoists and the like.

The object of this invention is to provide an improved construction of variable gearing by which any different variations in speed may be obtained in both a forward and reverse direction without the attendant disadvantages of the variable gearing or change speed gears as now in use more especially with motor cars. We accomplish this object by means of an improved gearing which comprises an epicyclic sun and planet gearing actuated from the driving shaft in which an internal toothed orbit is connected to the driven shaft through the medium of one or more oil cylinders and plungers with means for controlling and restricting the flow of oil therefrom so that any variable resistance may be introduced for the purpose of obtaining variable relative speeds of the two shafts. For reversing purposes the central toothed wheel upon the driving shaft is capable of being thrown out of gear with the primary planet wheels and thrown into mesh with secondary planet wheels through which the motion is transmitted through the medium of intermediate toothed wheels and the primary planet wheels to the internal toothed orbit which is connected to the driven shaft through the medium of the aforementioned oil cylinders and plungers. In this way variations of speed may be obtained in the reverse direction.

The invention will now be more fully described aided by a reference to the accompanying sheet of drawings in which:—

Figure 1 is a central longitudinal section of the gearing and Fig. 2 is a cross section taken on line *a—a* of Fig. 1. Fig. 3 is a front elevation showing the sun and planet wheels, the secondary planet wheels being shown by dotted lines. Fig. 4 is a side elevation of the primary and secondary planet wheels. Fig. 5 is a cross section on line *b—b* (Figs. 1 and 4) with the central sliding toothed wheel removed showing by dotted lines the gearing of the secondary planet wheels. Fig. 6 is a part sectional view showing the position of the gearing when locked for a direct drive.

In constructing a gearing according to this invention (applicable for motor cars or power launches) the driving shaft 1 carries a central toothed gear 2 slidably mounted upon a key or feather 3. This central toothed gear 2 meshes with one or more (preferably two) toothed planet wheels 4, which are hereafter designated the primary planet wheels. These primary planet wheels 4 are mounted upon spindles 5 secured to a suitable disk bracket or carrier 6 having a central recess within which the driving shaft 1 is housed upon suitable ball bearings 29. Upon this disk bracket or carrier 6 is revolubly mounted a drum or casing 7 working upon suitable ball bearings 30 and 31. Upon the face of the drum or casing 7 is secured a ring of internal teeth 8 which forms an orbit with which the primary planet wheels 4 mesh. This drum or casing 7 forms the medium of connection between the said orbit 8 and the driven shaft 9, the drum or casing 7 being keyed or otherwise fastened to the said driven shaft 9. The said drum or casing 7 is formed as an oil container and within its interior are arranged a series of radial cylinders 10 within which work plungers 11 connected by rods 12 to an eccentric or crank 13 keyed to the disk bracket or carrier 6 as shown in Fig. 1. Each of the said cylinders 10 is formed with an inlet valve 14 and an outlet valve 15 for the flow of oil. These valves 14 and 15 are preferably of the ball type as shown in Fig. 1 comprising a spring bearing on a ball so that in normal position the ball is on the seat with a certain amount of pressure whereby the gear automatically adjusts its variation in speed according to the load. The outlet valve 15 is controlled by a crank lever 16 one end of which is actuated by a sliding friction plate or clutch 17 loosely mounted on the driven shaft 9 and operated by a fork lever 18 on a rocking shaft 19 so that the pressure exerted by the springs on the valves 15 may be varied and the resistance of the oil in the cylinders 10 to the plungers 11 be under the control of the operator.

For the purpose of reversing the motion the central toothed gear 2 is slidably mounted upon a key or feather 3 on the shaft 1 being operated by a bifurcated lever 22 mounted upon a rocking shaft 23. When the central toothed gear 2 is moved out of engagement with the primary planet wheels 4 it may be in the neutral or non-operative position (as shown in dotted lines in Fig. 4) when the gearing will run freely, or when carried still further it is adapted to engage one or more secondary planet wheels 20 mounted upon a spindle attached to the disk bracket or carrier 6. This secondary planet wheel 20 is formed integral with another toothed wheel 21 which meshes with the primary planet wheels 4 through which the motion is transferred (in the reverse direction) to the internal toothed orbit 8. Thus on the forward movement the secondary planet wheels 20 and 21 run idly but on the reverse movement they convey the motion from the central toothed gear 2 to the primary planet wheels 4 and thence to the orbit 8 and driven shaft 9. The outer end of the spindles supporting the primary planet wheels 4 and the secondary planet wheels 20 and 21 respectively are mounted in a concentric ring 24 as shown.

For the purpose of affording a direct drive from the driving shaft 1 to the driven shaft 9 means are provided for locking the toothed gear 2 upon the said shaft 1 to the disk bracket or carrier 6. This may be effected by a clutch or the like or a series of internal teeth 25 may be formed upon the said disk bracket or carrier 6 which may be engaged by the central toothed gear 2 when the same is moved forward. In this position the said toothed gear 2 partly engages the primary planet wheels 4 and the said series of internal teeth 25. The whole of the intermediate gearing then becomes locked thereby coupling the driving shaft 1 direct to the driven shaft 9.

The whole of the gearing is inclosed in an oil proof casing 26 so that the whole may be running in oil. Furthermore we provide a brake 27 mounted on the driving shaft 1 and furnished with a brake band 28 connected to an operating lever, for the purpose of retarding the driving shaft 1 and allowing of the breaking or checking of the momentum of the machine being effected through the medium of the oil in the cylinders 10 thereby avoiding friction or shock.

The operation of the gearing is as follows:—For forward driving the central toothed gear 2 is thrown into engagement with the planet wheels 4. Upon starting, the valves 15 are released for an easy flow of oil when the plungers 11 are relatively free to move in the cylinders 10 with little or no resistance and the planet wheel disk carrier or bracket 6 is thus more or less free to rotate. By the closing of the valves 15 resistance is imparted to the disk carrier or bracket 6 through the medium of the oil plungers 11 in the cylinders 10 and this resistance is conveyed through the planet wheels 4 to the orbit 8 through which and the casing 7 the driven shaft 9 is rotated. The resistance by the medium of the oil within the cylinders 10 is increased by the operation of the clutch lever 18 until the casing 7 and the disk carrier 6 and the driving shaft 1 are running in unison when the central toothed gear 2 is moved forward so that it partly engages the series of internal teeth 25 as well as the planet wheels 4 and the two shafts 1 and 9 are then directly coupled. For reversing the toothed gear 2 is moved back out of engagement with the primary planet wheels 4 into engagement with the secondary planet wheels 20 by which the motion is conveyed through the wheels 21 to the planet wheels 4 and thence to the orbit 8 and the driven shaft 9 in a reverse direction through the medium of the oil cylinders 10 and plungers 11 connected to the eccentric 13.

By this improved variable speed gearing we are enabled to obtain any variation of speed in either a forward or reverse direction by varying the obstruction to the flow of oil through the valves 15 the shock or percussion of any changes or load variations being taken up in the compression of the oil.

We claim:—

1. In a variable gearing for the transmission of power, in combination, a driving shaft and a driven shaft, a central toothed gear on said driving shaft, planet wheels gearing with said toothed wheel, an internally toothed orbit gearing with said planet wheels, a loosely mounted carrier disk for said planet wheels, a drum or casing firmly secured upon said driven shaft and carrying said internally toothed orbit, oil cylinders and plungers within said drum or casing, an eccentric or crank attached to said carrier disk and connected to said drum, and means for controlling and restricting the flow of oil from said cylinders, substantially as described.

2. In a variable gearing for the transmission of power, in combination, an epicyclic orbit and planet gearing, a carrier for said planet gearing, an oil drum or casing carrying the orbit and constituting a resistance to the carrier for the planet gearing, cylinders and plungers within said drum, an eccentric or crank on said carrier connected to said plungers, means for controlling and retarding the flow of oil from said cylinders comprising an inlet and an outlet valve connected to each cylinder, said outlet valve having a spring bearing thereon, a series of levers connected to said bearing, a bifurcated arm or fork for operating said levers, a rocking shaft for said fork adapted to impart tension to said spring bearing the outlet valve, substantially as described.

3. In variable speed gearing for the transmission of power, in combination, a driving shaft and a driven shaft, epicyclic orbit and planet wheels, a carrier for said planet wheels, an oil drum or casing carrying the orbit and constituting a resistance for said carrier, internal cylinders and plungers, an eccentric or crank on said carrier to which said cylinders and plungers are connected, means for obtaining a reverse motion comprising a secondary planet wheel mounted upon the carrier, a central toothed wheel slidably mounted upon the driving shaft, intermediary toothed wheels connected to said secondary planet wheels, gearing with the primary planet wheels which in turn gear with the internal toothed orbit, substantially as described.

4. In variable gearing for the transmission of power, in combination, a driving shaft and a driven shaft, an epicyclic orbit and planet gearing, a carrier for said planet gearing, an oil drum or casing carrying the orbit constituting a resistance to said carrier, internal cylinders and plungers within said drum, an eccentric or crank on said carrier connected to said cylinders and plunger, means for coupling the driving shaft directly with the driven shaft comprising an internal series of teeth, a clutch upon the carrier, a slidably mounted toothed wheel upon the driving shaft adapted to partially engage with said clutch while being also in engagement with the primary planet wheel, substantially as described.

5. In a variable gearing for the transmission of power, in combination, an epicyclic orbit and planet gearing, a carrier for said planet gearing, an oil drum or casing carrying the orbit and constituting a resistance for the carrier of said planet gearing, cylinders and plungers within said drum, an eccentric or crank on said carrier connected to said plungers, a driving shaft, and a driven shaft, a drum and brake band mounted upon said driving shaft, and means for imparting tension to said brake band for retarding the movement of said driving shaft and for imparting a variable resistance to the driven shaft through the medium of the oil cylinders and plungers, and regulating valves therefor for braking or controlling the momentum of the machine, substantially as described.

In testimony whereof we have signed our names to this specification in the presence of two subscribing witnesses.

OSWALD ALFRED BEVAN.
LESLIE JAMES BEVAN.

Witnesses:
  Clem A. Hart,
  G. R. Cullen.